(12) United States Patent
Yoon et al.

(10) Patent No.: US 7,580,721 B2
(45) Date of Patent: Aug. 25, 2009

(54) METHOD OF COMMUNICATING USING A PUSH TO TALK SCHEME IN A MOBILE COMMUNICATION SYSTEM

(75) Inventors: Sung-Jae Yoon, Gumi-si (KR); Dong-Han Kang, Daegu (KR); Jae-Gwan Shin, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 517 days.

(21) Appl. No.: 11/194,604

(22) Filed: Aug. 2, 2005

(65) Prior Publication Data

US 2006/0040687 A1    Feb. 23, 2006

(30) Foreign Application Priority Data

Aug. 10, 2004    (KR) .................. 10-2004-0062925

(51) Int. Cl.
H04B 7/00    (2006.01)
(52) U.S. Cl. ..................... 455/518; 455/567
(58) Field of Classification Search .............. 455/412.2, 455/412.1, 414.4, 415, 401, 518–521
See application file for complete search history.

(56) References Cited

U.S. PATENT DOCUMENTS

2002/0150092 A1* 10/2002 Bontempi et al. .......... 370/389
2005/0287997 A1* 12/2005 Fournier ..................... 455/415

* cited by examiner

Primary Examiner—Tu X Nguyen
(74) Attorney, Agent, or Firm—Roylance, Abrams, Berdo & Goodman, L.L.P.

(57) ABSTRACT

A method for communicating using a Push To Talk (PTT) call traffic scheme in a mobile communication system. The method comprises the steps of selecting at least one subscriber with whom a calling user wants to communicate through the PTT call traffic scheme, determining if a Push To Data (PTD) is to be transmitted when sending a PTT call request, and selecting the PTD to be transmitted if the PTD is to be transmitted, in a calling mobile communication terminal, transmitting the PTD and the PTT call request message from the calling mobile communication terminal to at least one called mobile communication terminal of the selected subscriber via a PTT server, outputting contents of the PTD and indicating reception of the PTT call request to the selected subscriber by the called mobile communication terminal, when receiving the PTD and the PTT call request; and transmitting a PTT call request acceptance message to the PTT server to allow the calling and the called mobile communication terminals to communicate with each other through the PTT call traffic if the at least one called mobile communication terminal inputs the PTT call request acceptance key by the subscriber's operation.

6 Claims, 7 Drawing Sheets

METHOD OF COMMUNICATING USING A PUSH TO TALK SCHEME IN A MOBILE COMMUNICATION SYSTEM

PRIORITY

This application claims the benefit under 35 U.S.C. 119(a) of an application entitled "METHOD OF COMMUNICATION USING PUSH TO TALK SCHEME IN MOBILE COMMUNICATION SYSTEM" filed in the Korean Industrial Property Office on Aug. 10, 2004 and assigned Serial No. 2004-62925, the entire contents of which are hereby incorporated by reference.

BACKGROUND OF THE INVENTION

1. Field of the Invention

The present invention relates to a mobile communication system using a Push To Talk (PTT) scheme. More particularly, the present invention relates to a system and method for connecting call traffic based on the PTT communication.

2. Description of the Related Art

Push To Talk (PTT) is referred to as "a basic call traffic scheme" used for a walkie-talkie or Handheld Transceiver (HT). The PTT scheme allows a user to communicate with her/his counterpart by properly operating PTT buttons disposed on, for example, a walkie-talkie. Specifically, in an operation for communication based on the PTT scheme, the user simply presses the PTT button when talking to her/his counterpart, and releases the pressed PTT button when listening to her/his counterpart's talking. Such a PTT scheme provides one-to-one or one-to-multi party communication through which the users can simply and rapidly communicate with each other.

In recent years, conventional mobile communication systems have provided so called internet phone service such as a Voice over IP (VoIP) scheme in which a specific Internet Protocol (IP) has been pre-assigned to each of the terminals of the system. Similar to the walkie-talkie or HT, such a VoIP scheme can also allow the mobile communication terminals to communicate with each other in the form of mobile communication PTT service which is capable of providing one-to-one or one-to-multi communication.

Such a mobile communication PTT service can provide voice/data services through which multiple users or groups can communicate simultaneously with each other. In order to start the mobile communication PTT service, the user presses a PTT button disposed properly in the mobile communication terminal capable of providing the PTT service so that the PTT mobile communication terminal may send a PTT service request to a mobile communication network related therewith. Then, the mobile communication network denies or accepts the requested service to, in case of the acceptance, assign the requested resources based on the determination criterions such as availability of resources, priority of the requesting user, etc. If the requested service has been accepted, the mobile communication network sets up connections from among all the active users belonging to a certain user group. Consequently, the called mobile communication terminal outputs an alarm sound and message displays for indicating the received PTT call request to the corresponding called user who, then, recognizes the PTT call request to start speaking or communication with the calling user. After setting up a voice traffic connection, the user who has requested a voice service can send the voice information to the corresponding user who then can listen to the voice just sent.

As mentioned above, in such a mobile communication PTT service, the called mobile communication terminal provides the alarm indication or sound and the alarm message displays for indicating the received PTT call request to the corresponding user. The alarm messages includes an ID or phone number of the calling user, etc. Therefore, the called user recognizes the identity of the calling user based on the displayed alarm messages to determine if she/he will accept the requested PTT call or not. In the conventional mobile PTT communication service system, the called user has to determine whether or not she/he accepts the requested PTT call of the calling user based on only the ID or phone number of the calling user included in the alarm message displayed on the called mobile communication terminal. Accordingly, it is difficult for the called user to determine whether to respond to the requested PTT call because of insufficient information provided by the conventional PTT communication service.

SUMMARY OF THE INVENTION

Accordingly, the present invention has been made to solve the above-mentioned problems occurring in the prior art, and an object of the present invention is to provide a method for establishing call traffic based on a Push To Talk (PTT) scheme in a mobile communication system in which the called user can easily and conveniently determine to respond to the requested call.

Another object of the present invention is to provide a method for connecting call traffic based on a Push To Talk scheme in a mobile communication system in which the calling user can indicate the purpose or the subject of the requested call to the called user when sending the PTT call request.

In order to accomplish this object, according to a first aspect of the present invention, there is provided a method for communicating using a Push To Talk (PTT) call traffic scheme in a mobile communication system. The method comprising the steps of selecting at least one subscriber with whom a calling user wants to communicate through the PTT call traffic scheme, determining if a Push To Data (PTD) is to be transmitted when sending a PTT call request, and selecting the PTD to be transmitted if the PTD is to be transmitted, in a calling mobile communication terminal; transmitting the PTD and the PTT call request message from the calling mobile communication terminal to at least one called mobile communication terminal of the selected subscriber via a PTT server; outputting contents of the PTD and informing reception of the PTT call request to the selected subscriber by the called mobile communication terminal, when receiving the PTD and the PTT call request; and transmitting a PTT call request acceptance message to the PTT server to allow the calling and the called mobile communication terminals to communicate with each other through the PTT call traffic if the at least one called mobile communication terminal inputs the PTT call request acceptance key by the subscriber's operation.

BRIEF DESCRIPTION OF THE DRAWINGS

The above and other objects, features and advantages of the present invention will be more apparent from the following detailed description taken in conjunction with the accompanying drawings, in which.

Throughout the drawings, the same or similar elements, features and structures are represented by the same reference numerals.

DETAILED DESCRIPTION OF THE EXEMPLARY EMBODIMENTS

Hereinafter, embodiments of the present invention will be described with reference to the accompanying drawings. The exemplary embodiments comprising specific elements found in the following description are intended only to help to understand the present invention. Therefore, it will be understood by those skilled in the art that various changes in form and details may be made therein without departing from the spirit and scope of the invention.

Figure 1:
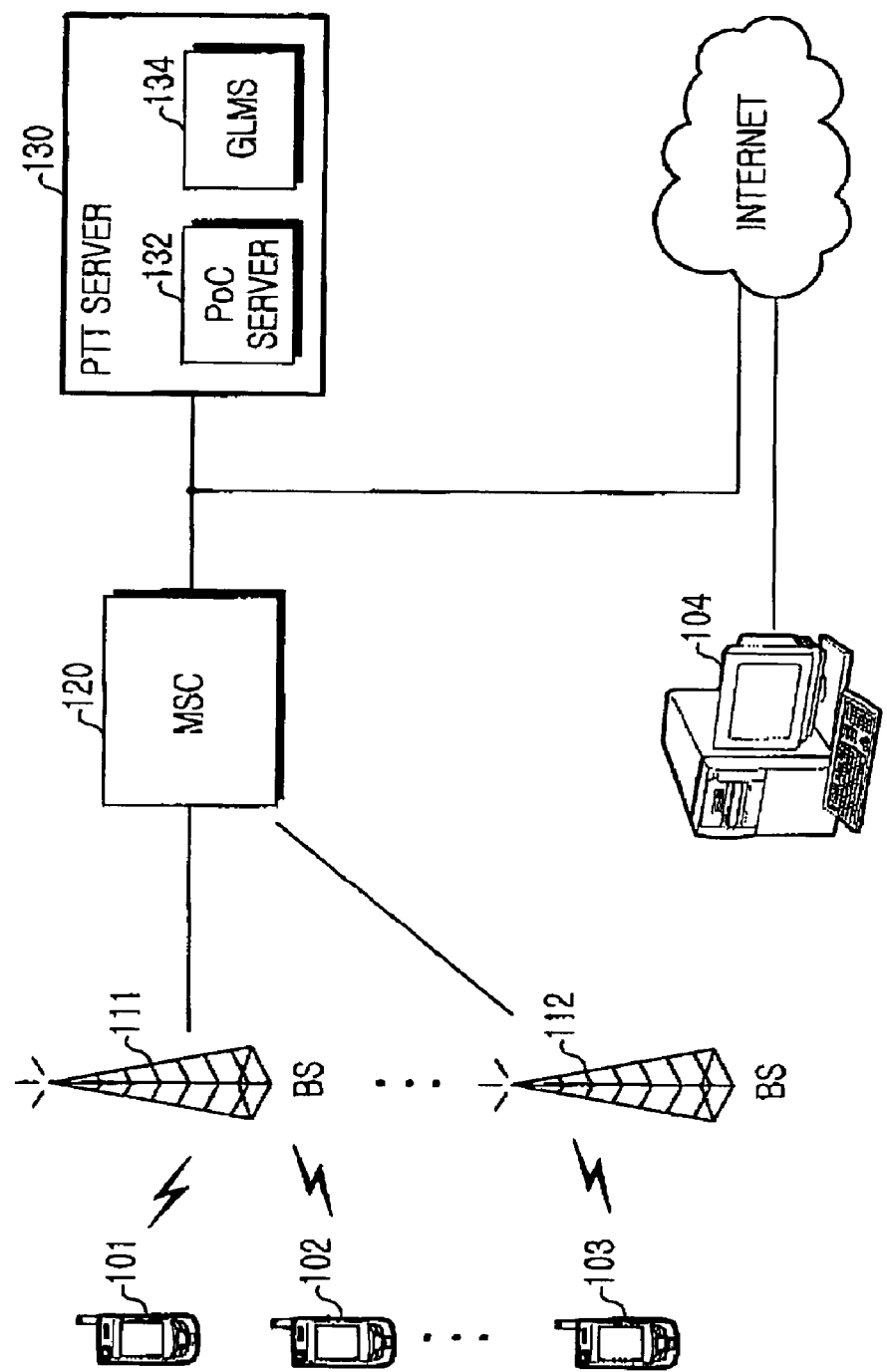
FIG. 1 illustrates a schematic block structure of a mobile communication system using a Push To Talk (PTT) scheme according to an embodiment of the present invention.

FIG. 1 illustrates a schematic block structure of a mobile communication system using a Push To Talk (PTT) scheme according to an embodiment of the present invention. Referring to FIG. 1, the mobile communication system using the PTT scheme comprises a plurality of base station transceiver systems (BTSs) 111 and 112 which communicate with a plurality of mobile communication terminals 101, 102 and 103 located in the service coverage area of the BTSs to provide the mobile communication services. The plurality of base station transceiver systems (BTSs) 111 and 112 are connected to a mobile switching center (MSC) 120 which again is connected to a PTT server 130 via a data network.

The PTT server 130 performs realtime management operation for PTT user groups comprising general controlling for PTT user groups, mediating and holding of PTT communication requests, distributing of subscriber registration lists and call setups/separations of needed systems and network resources. Such a PTT server 130 comprises a PTT over Cellular (PoC) server 132 for performing a communication function for the PTT service in the mobile communication network, and a Group and List Management Server (GLMS) 134 for managing PTT subscribers' information and subscriber group list also known as a "buddy list".

Each of the mobile communication terminals 101, 102 and 103 comprises a PTT module for performing PTT-related operations such as a PTT call request transferred to the PTT server 130 to wirelessly send the PTT call request in the form of previously and properly set format to the BTSs 111 and 112 when operating the PTT call traffic. The MSC 120 receives the PTT call request from the BTSs 111 and 112 and provides the received PTT call request to the PTT server 130. The MSC 120 has an Inter Working Function (IWF) for processing certain data packets such as a PTT call request with the PTT server 130.

The users can connect their mobile communication terminals 101, 102 and 103 to the PTT server 130 to perform modification operations such as establishing, changing or deleting the group list information and the individual information which have been previously set up by the users. Alternatively, the user can connect their personal computer 104 to the PTT server 130 via the Internet to also modify the group list information and the individual information which have been previously set by the user.

Figure 2A:
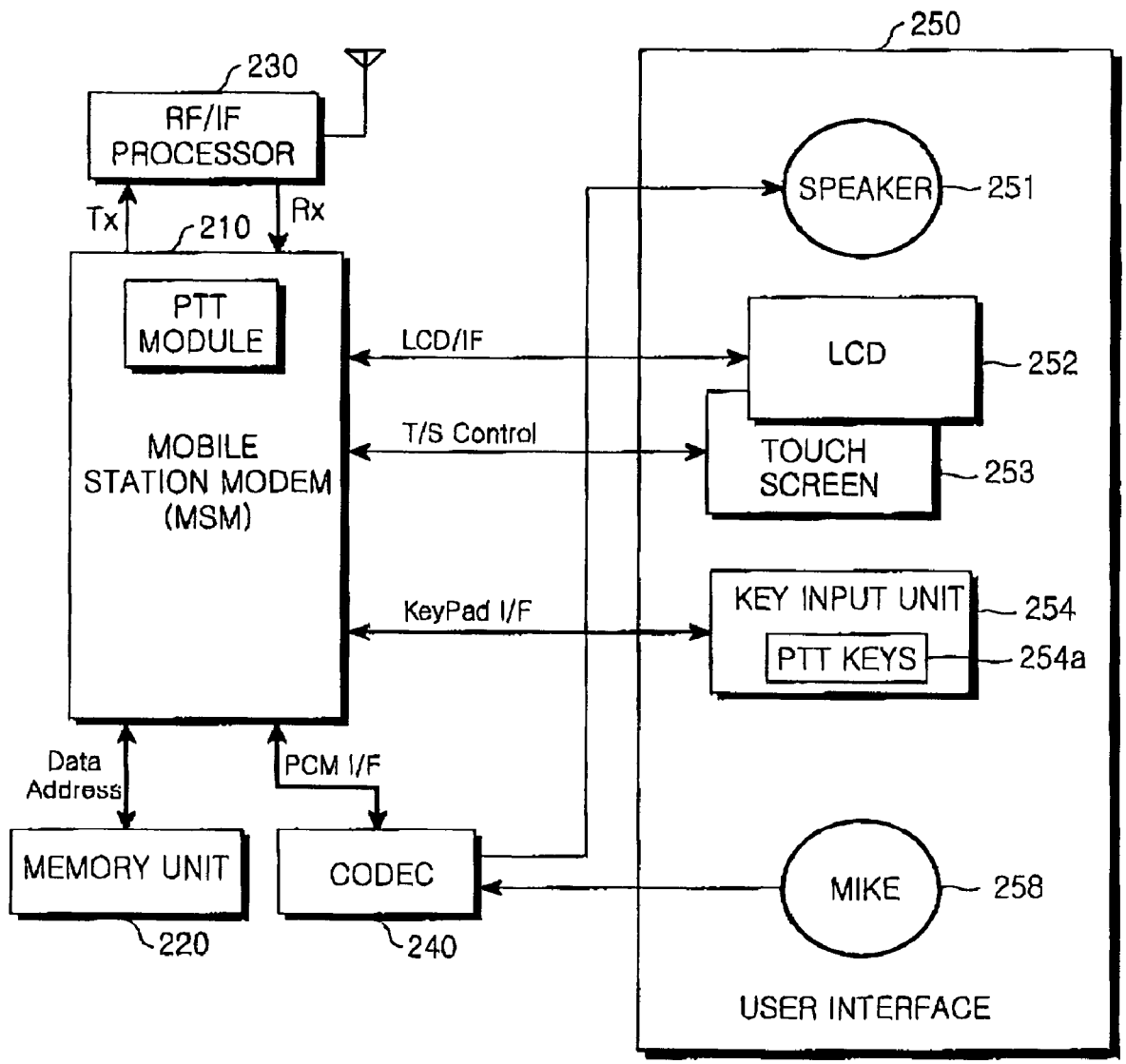
FIG. 2A illustrates a schematic block structure of a PTT mobile communication terminal according to an embodiment of the present invention.
Figure 2B:
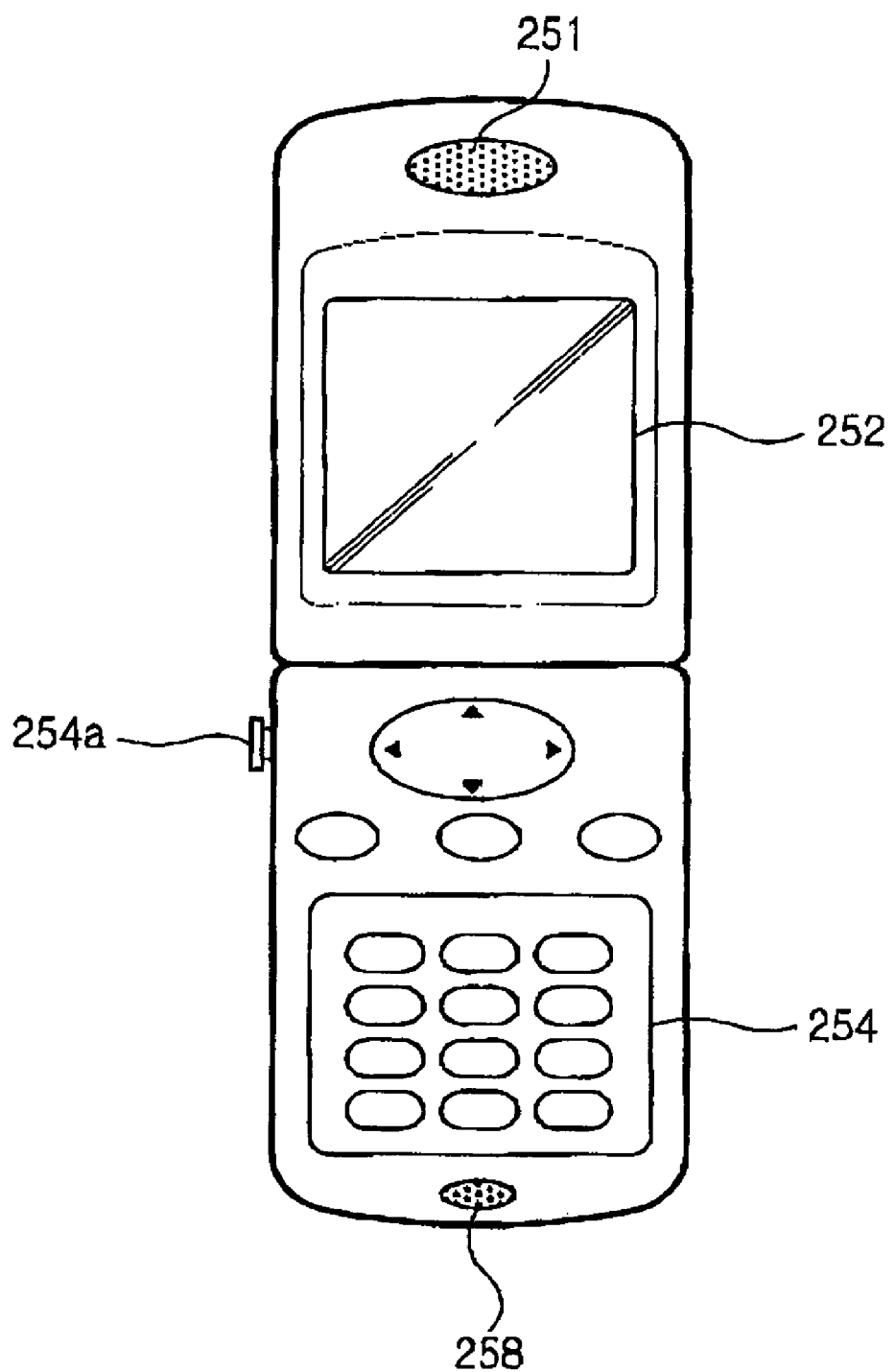
FIG. 2B illustrates an exterior structure of a PTT mobile communication terminal according to an embodiment of the present invention.

FIG. 2A illustrates a schematic block structure of a PTT mobile communication terminal according to an embodiment of the present invention, and FIG. 2B illustrates an exterior structure of a PTT mobile communication terminal according to an embodiment of the present invention. Referring to FIGS. 2A and 2B, the mobile communication terminal using the principle of the present invention is capable of performing interface operation with the user. The mobile communication terminal comprises a user interface 250, a radio frequency/ intermediate frequency (RF/IF) processor 230 for processing radio signals, a memory unit 220 having read only memory (ROM) and random access memory (RAM) for storing various operation programs and operation-related data, a voice signal processor (CODEC) 240 for processing voice signals and a mobile station modem (MSM) 210 for serving as a modem as well as a central processing unit for controlling a mobile communication terminal. The user interface 250 comprises a speaker 251, a display unit such as a Liquid Crystal Display (LCD) 252, a key input unit 254 and a mic 258.

Hereinafter, the operation of each function unit of the mobile communication terminal applied to an embodiment of the present invention will be described. First, in the user interface 250, the mic 258 converts the user's voice into an electrical signal to send the electrical signal to the voice signal processor (CODEC) 240. The speaker 251 receives the electrical signal from the voice signal processor 240 and generates an audible sound based on the received electrical signals. The key input unit 254 of the user interface 250 comprises a plurality of numeric/character keys for inputting numbers and characters, a plurality of function keys for performing the mobile communication functions, and dedicated PTT keys 254a for performing the PTT functions. Such a key input unit 254 transfers key input data to the mobile station modem 210 when the user inputs the related certain data or information through the keys of the unit. Although the dedicated PTT keys 254 are disposed in the separate form from the other keys on the key input unit as shown in FIG. 2A, the PTT keys may be implemented by using a part of the known or conventional keys. The display unit 252 which can be a LCD comprises a LCD controller, a memory for storing image data and LCD display elements. The display unit 252 displays characters or number information such as a current condition of the mobile communication terminal or background images related therewith. The display unit 252 may comprise a touch screen 253 for the LCD.

The RF/IF processor 230 comprises a RF transmitter for up-converting frequencies of the signals to be transmitted and amplifying the signals, and a RF receiver for low-noise amplifying received signals and down-converting the frequencies of the received signals. The RF/IF processor 230 receives modulated signals from the mobile station modem 210, converts the modulated signals into intermediate frequencies (IF). Also, the RF/IF processor 230 converts the intermediate frequencies into radio frequencies (RF) to be output to the BTSs via an antenna. Furthermore, the RF/IF receives the radio signals from the BTSs via an antenna so that the received radio signals are converted sequentially into the intermediate frequencies and the baseband to be provided to the mobile station modem 210.

The voice signal processor 240 which is typically formed of audio CODEC receives analog voice signals from the mic 258 to convert the received analog voice signals into digital signals such as pulse code modulation (PCM) which are transmitted to the mobile station modem 210. Also, the voice signal processor 240 receives digital signals (PCM) of a calling party's voice from the mobile station modem 210 to convert the received digital signals to the analog signals to be output to the speaker 251. Although the voice signal processor 240 is designed as a stand alone unit as shown in FIG. 2A, the processor 240 may be embedded integrally in the mobile station modem so that the processor and the modem may be combined together in the form of one chip.

The mobile station modem 210 can perform various functions of the mobile communication terminal in accordance with the key data input through the key input unit 254, while various information such as current states and user menu may be displayed on the display unit based on performing the functions. Especially, in the case of processing the voice signals for phone traffic, the mobile station modem 210 receives the PCM voice signals from the voice signal processor 240, and converts and modulates the received PCM voice signals by channel coding and interleaving to provide the converted and modulated signals to the RF/IF processor 230. Further, the mobile station modem 210 receives the voice signals provided from the RF/IF processor 230 and processes the received voice signals through demodulating, equalizing, channel decoding and de-interleaving to generate the resultant PCM voice signals which are then sent to the voice signal processor 240. Furthermore, the mobile station modem 210 has a PTT module for performing the PTT call traffic operation based on the characteristics of the present invention.

In operation of the mobile communication terminal shown in FIGS. 2A and 2B, if the user performs a dialing operation and setting operation for a calling mode through the key input unit 254, then the mobile station modem 210 monitors those operations and processes the input dialing information to then convert the input dialing information into corresponding radio signals through the RF/IF processor 230 to be output. Next, response signals are received from the calling party's terminal via the RF/IF processor 230 in the mobile station modem 210 so that the received response signals may be output to the speaker 251 via the voice signal processor 240 to consequently form a voice traffic path for communication. In the case of a calling mode, the mobile station modem 210 monitors just the calling mode through the RF/IF processor 230, and directs the voice signal processor 240 to generate corresponding ring signals. Next, similar to the calling mode, when the called party sends response signals, the mobile station modem 210 monitors that response signals which may be output to the speaker 251 via the voice signal processor 240 to consequently form a voice traffic path for communication. As mentioned above, only the exemplary voice communication was described for both the calling and the called modes according to an embodiment of the present invention. However, alternatively, data communication functions for packet data and image data and the PTT communication operation based on PTT key inputs also can be applied to the present invention.

Figure 3:
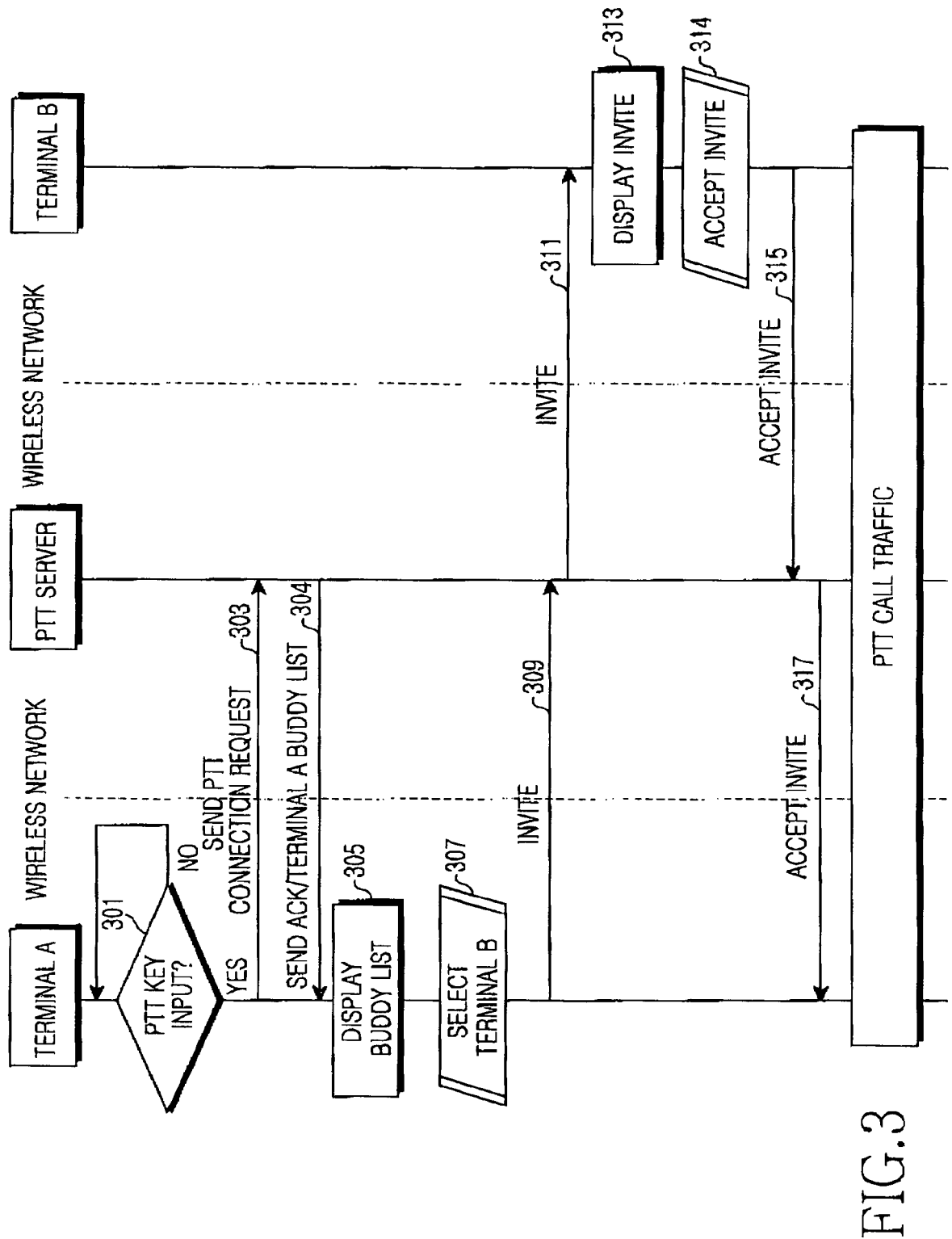
FIG. 3 illustrates a flow chart for explaining the operation process of a general PTT call traffic connection in the mobile communication system of FIG. 1 according to an embodiment of the present invention.

FIG. 3 illustrates a flow chart for explaining an operation process of a general PTT call traffic connection in the mobile communication system of FIG. 1. Referring to FIG. 3, firstly, if the user who wants the PTT communication inputs the PTT keys disposed on a mobile communication terminal (terminal A in FIG. 3) or operates PTT call functions by a menu setting operation, then in step 301, the mobile station modem confirms the PTT key input or the operation of the PTT call functions to drive PTT application. Next, in step 303, the mobile station modem sends the PTT connection request message to the PTT server via the wireless network. If the PTT server confirms the corresponding user who has previously sent the PTT connection request message through the GLMS server, then in step 304, the PTT server acknowledges the PTT connection request of the corresponding user and sends a buddy list which is a subscriber information of the terminal A PTT call traffic group, to the corresponding user (i.e., sending ACK/terminal A buddy list). Accordingly, the mobile station modem of the terminal A receives such a buddy list so that the display unit may properly display the buddy list in step 305. Referring to the displayed buddy list, the user of the terminal A can operate proper direction keys to select her/his counterpart who the user wants to communicate with through the PTT scheme. Specifically, in step 307, the mobile communication terminal (terminal A) inputs the selected counterpart or the selected subscriber (in case of FIG. 3, terminal B) by the user's operation. Next, in step 309, the mobile communication terminal (i.e., terminal A) sends a PTT call request message (referred to as an "INVITE") for the selected subscriber (i.e., the terminal B) to the PTT server via the wireless network. Such a PTT call request message (INVITE) comprises, for example, an ID information of the calling or called side.

Hereinafter, a description will be made in more detail about the step that the mobile communication terminal (TERMINAL A) sends the PTT call request (INVITE) to the PTT server. Above all, the mobile communication terminal (terminal A) sends the PTT call request message (INVITE) in the form of SDB (Short Data Burst) to the base station to which the terminal A is connected. Then, the mobile communication terminal (terminal A) negotiates (nego) with the base station for service option (SO_PTT) to provide the PTT service, and performs Traffic Channel (TCH) setup. The term "nego" refers to a process for preparing for higher network sessions which range from physical layers including PPP session to application layers.

The base station sends the PTT call request message (INVITE) to the PTT server which then confirms the ID of the called side based on the received message (INVITE). Next, in step 311, the PTT server sends the PTT call request message (INVITE) to the called mobile communication terminal (terminal B). Then, the called mobile communication terminal (terminal B) receives the PTT call request message (INVITE), and in step 313, informs the reception of the PTT call request message (INVITE) to the corresponding user by sounding the proper alarm sound and displaying the proper alarm message.

Steps 311 and 313 will be described in more detail as follows. The PTT server sends the PTT call request message (INVITE) to a corresponding base station which provides the services to the called mobile communication terminal (terminal B). The corresponding base station for the called mobile communication terminal periodically sends a paging signal such as a General Page (GP) to the called mobile communication terminal (terminal B) which then sends the corresponding response signal such as a Page Response (PS) for the GP to the corresponding base station. During such a paging process, the base station sends the PTT call request message (INVITE) in the form of SDB to the called mobile communication terminal (terminal B). Then, the called mobile communication terminal informs the reception of the PTT call request message (INVITE) to the called user. At the same time, the called mobile communication terminal (terminal B) sends an acknowledgement of the normal reception of the PTT call request message (INVITE) to the base station.

If the called user has recognized the reception of the PTT call request message (INVITE) in step 313, the called user can allow or accept the corresponding PTT call request by operating the proper keys such that, in step 314, the called mobile communication terminal (terminal B) can receive the key inputs for accepting the PTT call request, and in step 315 can send the PTT call request acceptance message to the PTT server via the wireless network. In step 317, the PTT server indicates just the PTT call request acceptance to the calling mobile communication terminal (terminal A) to allow calling through the PTT call traffic.

Steps 315 and 317 will be described in more detail as following. When sending the PTT call request acceptance, the called mobile communication terminal (Terminal B) sends the PTT call request acceptance message (so called "200 OK") in the form of SDB to a corresponding base station. Then, the called mobile communication terminal (terminal B) negotiates (nego) with the corresponding base station for service option (SO_PTT) to provide the PTT service, and performs Traffic Channel (TCH) setup. The PTT call request acceptance message (200 OK) originated in the called mobile communication terminal (terminal B) is transferred finally to the calling mobile communication terminal (terminal A) via the base station of the called side, the PTT server and the base station of the calling side. The calling mobile communication terminal (terminal A) receives the PTT call request acceptance message to complete the traffic channel setup. Also, the calling mobile communication terminal informs the PTT call request acceptance to its user by displaying the alarm message through the display unit.

In the PTT call traffic between the calling and the called mobile communication terminals, a specific terminal (for example, terminal A) sends a speaking right request message referred to as a "Session Initiation Protocol (SIP) Ack" to the PTT server. Then, the PTT server controls the speaking permission requests between the terminals to grant the speaking permission to a proper mobile communication terminal. The mobile communication terminal which has obtained the speaking right transmits, in realtime, the talk burst to the PTT server through a Real Time Protocol (RTP). The PTT server performs buffering of the talk burst to transmit the buffered talk burst to the called mobile communication terminal through the RTP.

Figure 4:
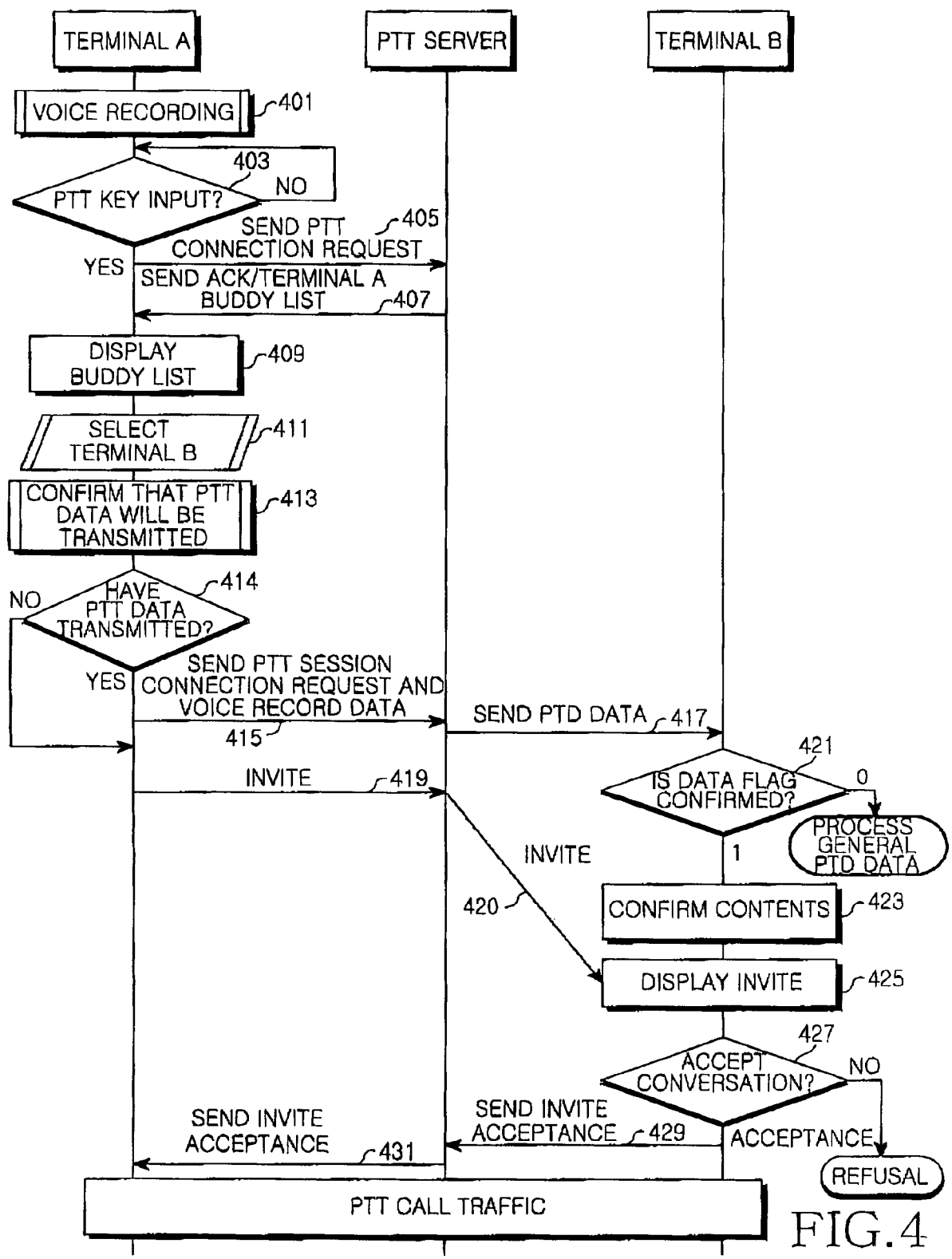
FIG. 4 illustrates a flow chart for explaining the operation process of a PTT call traffic connection in the mobile communication system according to an embodiment of the present invention.

FIG. 4 illustrates a flow chart for explaining an operation process of a PTT call traffic connection in the mobile communication system according to an embodiment of the present invention. Referring to FIG. 4, the user who wants the PTT communication may pre-record a voice message which can be performed by a voice record function typically provided in the mobile communication terminals. In step 401, the calling mobile communication terminal (terminal A) makes such a voice record according to the user's operation. In this case, the contents of the voice record may be a guide information for indicating the purpose or subject of the calling request provided by the calling user according to an embodiment of the present invention as described later.

Next, as the user inputs the PTT keys provided in the mobile communication terminal (terminal A) or performs the operation of the PTT communication functions through the menu setup procedures, the mobile station modem thereof confirms the key inputs or the user's operations to drive the PTT applications in step 403. Then, in step 405, the mobile station modem sends the PTT connection request message to the PTT server via the wireless network. The PTT server which has received the PTT connection request message acknowledges the PTT connection request and sends the buddy list of the corresponding user in step 407. The mobile station modem 210 receives the buddy list and in step 409, directs the display unit 252 to display the received buddy list in proper form. Therefore, the corresponding user can selects his/her counterpart for communicating therewith by operating the direction keys based on the displayed buddy list. Specifically, in step 411, the mobile communication terminal (terminal A) selects a subscriber's terminal (for example, terminal B in FIG. 4) which the calling user wants to communicate with, by the user's operation.

If the mobile communication terminal selects the subscriber for the PTT communication by the user's input in step 411 as mentioned above, in step 413 the mobile communication terminal performs a Push To Data (PTD) transmission acknowledge according to an embodiment of the present invention such that the mobile communication terminal determines if the PTD data will be transmitted and if transmitted, selects the PTD data to be transmitted, based on the user's inputs through separate windows. If the mobile communication terminal confirms the transmitted data is not the PTD in step 414, the process goes to step 419 wherein the general communication call requests are performed. If just the PTD data are confirmed, the process goes to step 415. In this case, the transmitted PTD data may be the recorded voices providing the purpose or subject of the corresponding PTT call request which have been previously recorded in step 410.

In step 415, the mobile communication terminal (terminal A) sends a PTD session connection request to the PTT server and sends the selected voice record data immediately after completing the PTD session connection. In this case, the transmitted PTD data may be transmitted with a certain flag set in advance, for example, set as '1' in order to indicate that the PTD data is related to the PTT call request according to an embodiment of the present invention. Next, in step 417, the PTT server sends the PTD data to the called mobile communication terminal (terminal B).

The mobile communication terminal (terminal B) which has received the PTD data determines if the received PTD data is related to PTT call request through the data flag mentioned above in step 421. If the data flag indicates that the PTD data is related to the PTT call request (i.e., if the flag is '1'), the process goes to step 423, whereas if the data flag does not reflect '1', nor does the data relate to the PTT call request, then the general PTD data process will be performed. In step 413, the received PTD data are output or displayed for the user's reference or confirmation. Next, in step 415, similar to the reception of the general PTT call request message (INVITE), a proper alarm message is displayed to indicate the reception of the PTT call request to the corresponding user.

Accordingly, the user can confirm the contents of the PTD data in step 423, and previously know the purpose or subject of the PTT call request of step 425 to conveniently send the acceptance or refusal of the PTT call request by operating the proper keys. In step 425, the called mobile communication terminal (terminal B) confirms the acceptance or refusal of the PTT call request. If accepted, then the process goes to step 429 wherein the called mobile communication terminal (terminal B) sends the PTT call request acceptance message to the PTT server via the wireless network. In step 431, the PTT server relays the PTT call request acceptance message to the calling mobile communication terminal (terminal A) such that the PTT call traffics are made between the calling and the called mobile communication terminals.

In the above process, if it is confirmed that the PTD data are not transmitted in step 414, then the process goes to step 419 wherein the general PTT call request operation is performed. Specifically, firstly the calling mobile communication terminal (terminal A) sends the PTT call request message (INVITE) to the PTT server in step 419. Next, in step 420, the PTT server sends the PTT call request message to the called mobile communication terminal (terminal B). Then in step 425, the called mobile communication terminal (terminal B) informs the reception of the PTT call request message (INVITE) to the called user.

Figure 5:
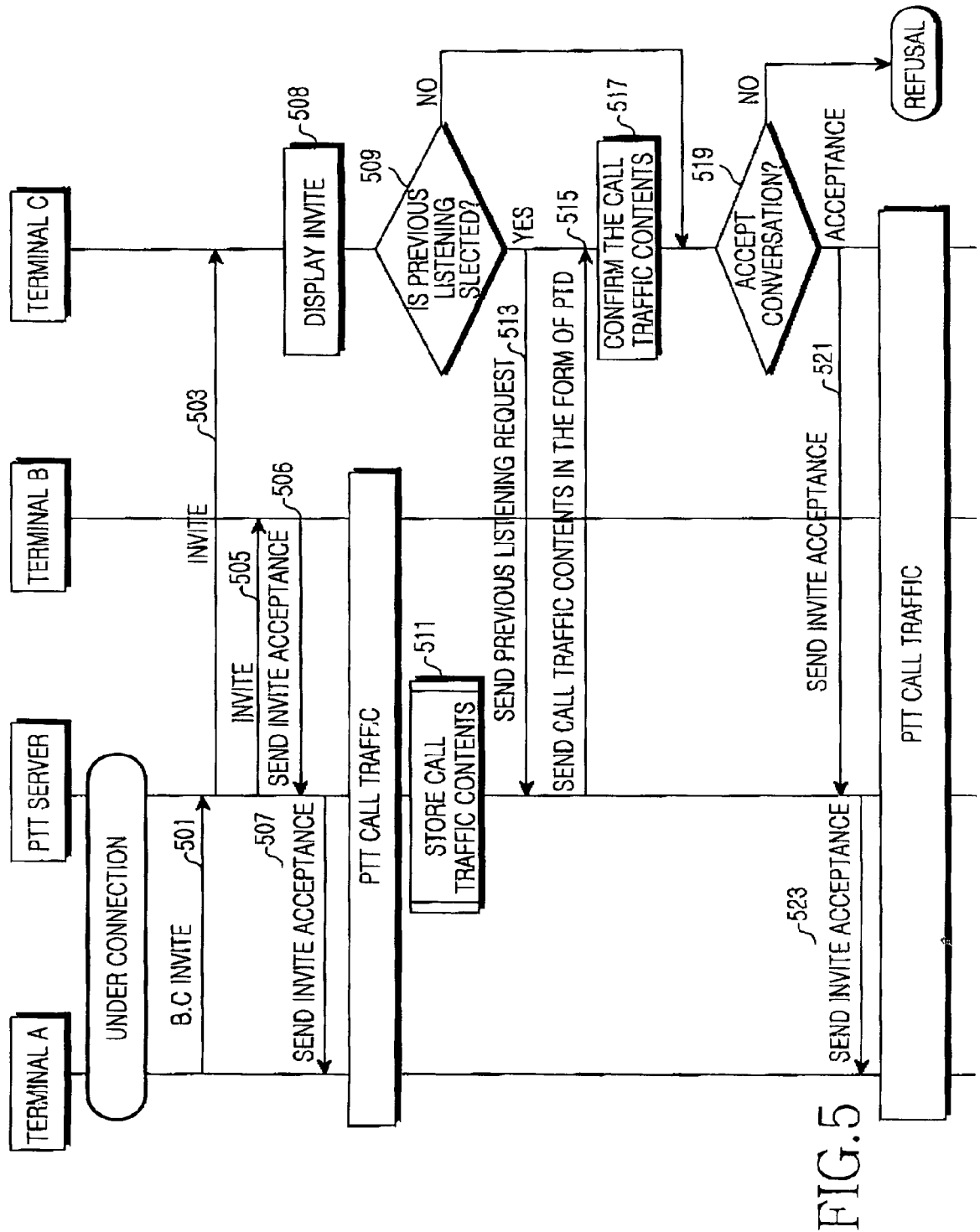
FIG. 5 illustrates a flow chart for explaining the operation process of a PTT call traffic connection in the mobile communication system according to another embodiment of the present invention.

FIG. 5 illustrates a flow chart for explaining an operation process of a PTT call traffic connection in the mobile communication system according to another embodiment of the present invention. Referring to FIG. 5, when the PTT server is connected to the calling mobile communication terminal (terminal A), the calling user can search for a buddy list displayed on her/his terminal (terminal A) to select a certain subscriber who the user wants to communicate with, by operating the direction keys. Specifically, in step 501, the calling mobile communication terminal sends, to the PTT server, the PTT call request messages (INVITE) for the selected subscriber's terminals (for example, terminals B and C in FIG. 5) which the calling user wants to communicate with. In steps 503 and 505, the PTT server transfers the corresponding PTT call request messages to the corresponding called mobile communication terminals (terminals B and C), respectively.

In step 506, anyone of all the called mobile communication terminals (for example, Terminal B in FIG. 5) accepts the PTT call request and sends the acceptance message to the PTT server via the wireless network. Then, in step 507, the PTT server transfers the PTT call request acceptance to the calling mobile communication terminal (terminal A) to consequently make the PTT call traffics between both terminals (terminals A and B). In this case, the PTT server stores a certain amount of traffic contents (for example 3 minutes amount of traffic contents) between the two terminals (terminals A and B) by using a buffering operation in step 511.

Figure 6A:
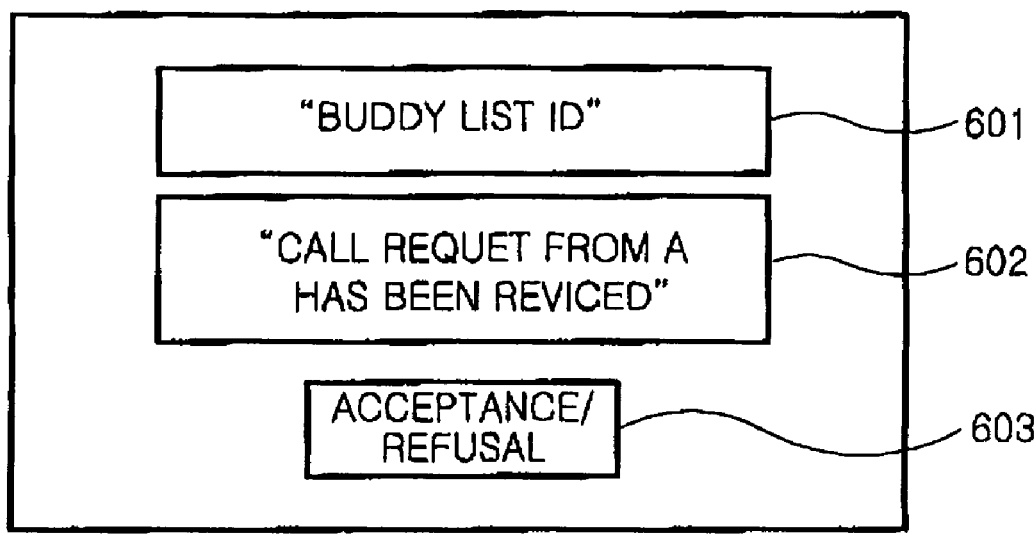
FIG. 6A illustrates an exemplary user interface display when performing the PTT call traffic connection operation in a PTT mobile communication terminal according to a prior art.
Figure 6B:
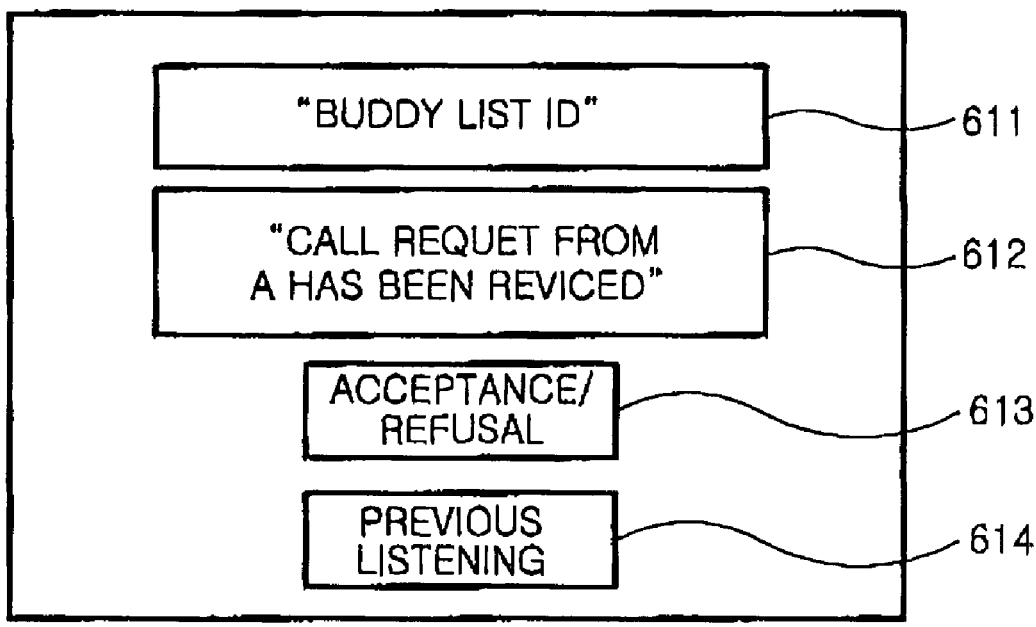
FIG. 6B illustrates an exemplary user interface display when performing the PTT call traffic connection operation in a PTT mobile communication terminal according to an embodiment of the present invention.

Hereinafter, a description will be made in more detail about the remaining called mobile communication terminal (terminal C) which has received the PTT call request message (INVITE) in step 503. In step 508, the called mobile communication terminal (terminal C) indicates the reception of the PTT call request message (INVITE) to the corresponding user by outputting the proper alarm sound and displaying the alarm message. FIG. 6B illustrates an exemplary user interface screen_for indicating the reception of the PTT call request message (INVITE) according to an embodiment of the present invention. Referring to FIG. 6B, the display of the user interface may comprise for example, a buddy list ID output window 611 for displaying the buddy list ID of the calling user who has sent the corresponding PTT call request message (INVITE) when receiving the INVITE, an information output window 612 for indicating that the received request is just the PTT call request message (INVITE), a selection icon 613 for acceptance (conversation)/refusal menu and a selection icon 614 for previous listening which is a characteristic according to an embodiment of the present invention. FIG. 6A shows an exemplary conventional user interface display for receiving the PTT call request message (INVITE). The user interface display of the prior art comprises only a buddy list ID output window 601 for displaying the buddy list ID of the calling user who has sent the corresponding PTT call request message (INVITE) when receiving the INVITE, an information output window 602 for indicating that the received request is just the PTT call request message (INVITE), and a selection icon 603 for acceptance (conversation)/denial menu as shown in FIG. 6A.

In step 509, the called mobile communication terminal (terminal C) determines if the selection icon 614 for previous listening has selected just the previous listening by the corresponding user through the display windows shown in FIG. 6B. According to the selection or non-selection of the previous listening, the process may go to (either) step 513 or 519. In the case of step 513, the mobile communication terminal sends the previous listening request to the PTT server which then in step 511, sends the previously stored traffic contents in the form of the PTD data to the mobile communication terminal (terminal C). After this, the mobile communication terminal (terminal C) outputs the received traffic contents (for example, the purpose of the call request) of the PTD data for the user's reference to determine whether or not she/he accepts the call request or conversation with her/his counterpart. Accordingly, the user who has confirmed the contents of the PTD data through step 517 knows previously the PTT group traffic contents to conveniently accept or refuse the call request or conversation with her/his counterpart. The mobile communication terminal (terminal C) confirms the acceptance or the refusal of the PTT call request in step 519. If accepted, then the mobile communication terminal (terminal C) sends the PTT call request acceptance to the PTT server via the wireless network in step 521. Consequently, in step 523, the PTT server informs such a PTT call request acceptance to the calling mobile communication terminal (terminal A) to accomplish the PTT communication between the mobile communication terminals (terminals A, B and C).

According to an embodiment of the present invention, in the PTT call traffic operation, the called user may confirm the previously stored voice record contents and PTT call traffic contents of the calling user to conveniently and easily determine acceptance or refusal of the PTT call request of the calling user based on the above conformed contents. Also, the calling user may previously inform her or his purpose or subject of the PTT call request to the called user when sending the PTT call request.

As mentioned above, the PTT call traffic operation may be performed in the mobile communication system according an embodiment of the present invention. While the invention has been shown and described with reference to certain embodiments thereof, it will be understood by those skilled in the art that various changes in form and details may be made therein without departing from the spirit and scope of the invention as defined by the appended claims.

What is claimed is:

1. A method for communicating using a Push To Talk (PTT) call traffic scheme in a mobile communication system, the method comprising the steps of:

selecting at least one subscriber with whom a calling user wants to communicate through the PTT call traffic scheme, determining if a Push To Data (PTD) is to be transmitted when sending a PTT call request, and selecting the PTD to be transmitted if the PTD is to be transmitted, in a calling mobile communication terminal;

transmitting the PTD and the PTT call request message from the calling mobile communication terminal to at least one called mobile communication terminal of the selected subscriber via a PTT server;

outputting contents of the PTD and informing reception of the PTT call request to the selected subscriber by the called mobile communication terminal, when receiving the PTD and the PTT call request; and transmitting a PTT call request acceptance message to the PTT server to allow the calling and the called mobile communication terminals to communicate with each other through the PTT call traffic if the at least one called mobile communication terminal inputs the PTT call request acceptance key.

2. The method as claimed in claim 1, wherein the step of transmitting the PTD data from the calling mobile communication terminal to the at least one called mobile communication terminal comprises setting up a flag indicating that the PTD data relates to the PTT call request, wherein the called mobile communication terminal recognizes that the received PTD data relates to the PTT call request, based on the flag included in the received PTD data.

3. A method for communicating using a Push To Talk (PTT) call traffic scheme in a mobile communication system, the method comprising the steps of:

storing, previously in a PTT server, PTT call traffic contents transmitted between calling and called mobile communication terminals;

indicating a reception of a PTT call request by outputting a predetermined alarm sound and displaying an alarm message in the called mobile communication terminal, when the called mobile communication terminal receives the PTT call request message from the calling mobile communication terminal;

transmitting a request message for confirming a current PTT call traffic contents from the called mobile communication terminal to the PTT server when the called mobile communication terminal inputs a function setup for confirming the current PTT call traffic contents by a user operation;

transmitting the stored PTT call traffic contents of the calling mobile communication terminal from the PTT server to the called mobile communication terminal, when the PTT server receives the request message for confirming the current PTT call traffic contents from the called mobile communication terminal; and outputting, by the called mobile communication terminal, the PTT call traffic contents of the calling mobile communication terminal transmitted from the PTT server.

4. The method as claimed in claim 3, wherein the PTT server comprises a PTT over cellular server and a Group and List Management Server (GLMS).

5. The method as claimed in claim 3, wherein the calling mobile terminal provides a Session Initiation Protocol Ack message to the PTT server.

6. The method as claimed in claim 3, wherein the calling mobile terminal communicates to the PTT server using Real Time Protocol.

* * * * *

UNITED STATES PATENT AND TRADEMARK OFFICE
CERTIFICATE OF CORRECTION

PATENT NO. : 7,580,721 B2  Page 1 of 1
APPLICATION NO. : 11/194604
DATED : August 25, 2009
INVENTOR(S) : Yoon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 905 days.

Signed and Sealed this

Fourteenth Day of September, 2010

David J. Kappos
*Director of the United States Patent and Trademark Office*